United States Patent
Stoller et al.

(10) Patent No.: US 8,296,024 B2
(45) Date of Patent: Oct. 23, 2012

(54) CALIBRATING TRANSMISSION MOTOR TORQUE

(75) Inventors: Jason Stoller, Morton, IL (US); Chad Brickner, Aurora, IL (US); Brian Lister, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 308 days.

(21) Appl. No.: 12/818,782

(22) Filed: Jun. 18, 2010

(65) Prior Publication Data
US 2011/0313630 A1 Dec. 22, 2011

(51) Int. Cl.
*G06F 7/00* (2006.01)

(52) U.S. Cl. ........... 701/60; 701/54; 701/51; 701/55; 701/61; 701/33.1; 701/87; 701/90; 477/41; 477/47; 477/115; 477/43; 477/50; 475/208; 475/209; 60/327; 60/445; 60/448; 60/449; 60/452

(58) Field of Classification Search ............ 701/60, 701/54, 51, 61, 87, 90, 33.1; 477/41, 47, 477/115, 43, 100, 50, 45, 3; 475/208, 209
See application file for complete search history.

(56) References Cited

U.S. PATENT DOCUMENTS

| | | | |
|---|---|---|---|
| 5,628,187 A * | 5/1997 | Gollner | 60/327 |
| 6,188,944 B1 | 2/2001 | Kolmanovsky et al. | |
| 6,251,043 B1 | 6/2001 | Gierling | |
| 7,588,514 B2 | 9/2009 | McKenzie et al. | |
| 2008/0027614 A1 | 1/2008 | Field et al. | |
| 2008/0202112 A1 * | 8/2008 | DeMarco et al. | 60/445 |
| 2008/0294318 A1 * | 11/2008 | Kuras et al. | 701/56 |
| 2009/0105041 A1 | 4/2009 | McKenzie et al. | |
| 2011/0313630 A1 * | 12/2011 | Stoller et al. | 701/60 |

FOREIGN PATENT DOCUMENTS

KR 200100056923 B1 7/2001
* cited by examiner

*Primary Examiner* — Redhwan k Mawari
(74) *Attorney, Agent, or Firm* — Leydig, Voit & Mayer (57) ABSTRACT

The described system and method allow a controller to calibrate a transmission variator of a continuously variable transmission for torque control by obtaining static and dynamic qualities and parameters of the variator through an automated calibration procedure. The system and method employ a pair of transmission mode configurations and operational configurations in combination to obtain system-specific information. In this way, the system is able to calibrate out the system variations to provide effective feed forward torque control of the continuously variable transmission. In an embodiment, a first calibration operation is performed while the transmission is neutralized and a second calibration operation is performed while the transmission is engaged in a mode providing a fixed variator output speed.

21 Claims, 5 Drawing Sheets

CALIBRATING TRANSMISSION MOTOR TORQUE

TECHNICAL FIELD

This patent disclosure relates generally to transmission systems for propulsion and, more particularly to a method and system for calibrating a torque provided by such a transmission.

BACKGROUND

A system that provides a rotating shaft output can be classified by speed, power, and torque. Although these measures are related in some ways, the concept of torque may be more closely aligned with the experience of the user is operating such a machine. However, in certain environments, it is traditionally difficult to control torque accurately due to lack of adequate calibration. For example, effectively controlling torque in a continuously variable transmission is difficult without accurate system identification of the many hydrostatic variator static and dynamic qualities and parameters. More specifically, variability in hydrostatic variator system components such as valves and hydraulic pump and motor components can prevent the ability to control torque in the transmission. While open-loop torque control with closed-loop feedback may be used with some success, it does not entirely eliminate the need for efficient and accurate torque calibration.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY

The described principles allow a controller to obtain the necessary static and dynamic qualities and parameters to allow accurate torque control of a continuously variable transmission. In an embodiment, the system uses a series of pairs of transmission mode configurations and operational configurations in combination to obtain system-specific identification and variations. For example, unique spring strengths, component tolerances, and so on often endow a given variator with properties that differ from the analogous properties in a counterpart system of the same make and model. In certain embodiments, the present system is able to calibrate out the variations in order to allow effective feed forward torque control of a continuously variable transmission.

The described method for calibrating hydrostatic transmission motor torque entails configuring and operating the transmission in specific mode/operation pairs to aid in system identification and calibration. In an embodiment, a method performs particular operations within particular transmission modes to allow system identification of the hydrostatic variator system. In an example implementation, the first such operation is performed while the transmission is neutralized. In this mode, the system commands a hydraulic pressure to the variator actuator component to identify the relationship between commanded hydraulic pressure and variator displacement. This relationship may be measured as a motor speed ratio (motor speed over pump speed) or may be measured by way of a swash plate angle sensor. Thus, although this description will generally refer to motor speed ratio to describe variator displacement, it will be appreciated that at every such instance, another measure such as swash plate angle may instead be used.

In a next mode, the transmission in engaged such that the variator system is able to build circuit pressure with the hydraulic motor output shaft locked at fixed speed or zero speed. In this mode, the system commands hydraulic pressure to the variator actuator component to identify the relationship between commanded hydraulic pressure and variator circuit pressure.

The relationships acquired from imposing these two mode/operation pairs provide calibration information to effectively control the transmission using feed forward torque control methods.

Further and alternative aspects and features of the disclosed principles will be appreciated from the following detailed description and the accompanying drawings, of which:

DETAILED DESCRIPTION

This disclosure relates to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine for a variety of tasks, including, for example, loading, compacting, lifting, brushing, and include, for example, buckets, compactors, forked lifting devices, brushes, grapples, cutters, shears, blades, breakers/hammers, augers, and others. In an example embodiment, the system is applied to a continuously variable transmission (CVT), such as may be used in wheel loader or motor grader machine applications.

In overview, a hydrostatic transmission with a variable displacement pump and fixed or variable displacement motor is used in combination with mechanical gearing in a transmission powered by an engine that is operated at a substantially constant speed. The hydrostatic transmission has a system pressure (circuit pressure) and a gear (or mode) that determine the transmission output torque. Thus, the driveline torque is controlled by controlling the pressure in the hydrostatic transmission. In an embodiment, the control is a combination of open loop and closed loop control as opposed to pure closed loop control, which, in the inventor's experience, does not provide adequate response time.

Within the hydrostatic transmission, torque control is accomplished by controlling the swash plate angle on a variable displacement pump. In turn, the swash plate angle is controlled by a swash plate actuator. In order to provide open loop control in an accurate and effective manner within this system, the spring pressure in the actuator and the correlation between the actuator position and system pressure are determined. This is necessitated by the fact that, due to manufacturing tolerances with respect to various components, there may be as much as a 30% difference in the operational and mechanical parameters of any particular hydrostatic transmission relative to another hydrostatic transmission of the same make and model.

Figure 1:
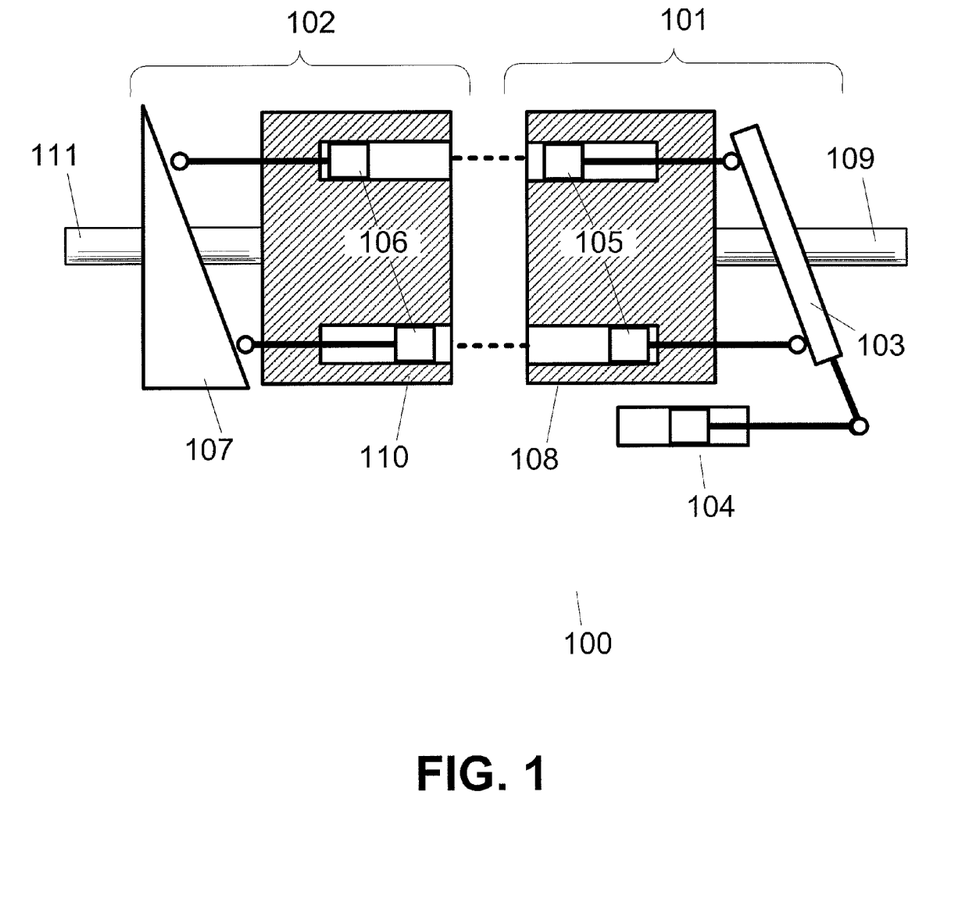
FIG. 1 is a schematic system diagram of a variator for providing a variable output torque based on an applied control pressure differential in accordance with the disclosed principles.

FIG. 1 is a detailed schematic drawing of a variator 100 for providing a variable output torque based on an applied control pressure differential. The variator 100 comprises a pump 101 and a motor 102. The pump 101 comprises a variable angle swash plate 103 set by a swash plate actuator 104. A number of pistons 105 in respective chambers ride on the swash plate 103 via sliding contacts, such that the range of movement of the pistons 105 is set by the angle of the swash plate 103. The chambers for the pistons 105 are formed in a pump carrier 108 that is rotated via the pump input shaft 109.

The motor 102 comprises a similar arrangement including a number of pistons 106 in respective chambers. The pistons 106 of the motor 102 are slidably engaged upon a fixed swash plate 107. The chambers of the pistons 105 of the pump 101 are in fluid communication with the chambers of the pistons 106 of the motor 102 via hydraulic fluid that fills the chambers and intervening conduits (not shown). The chambers for the pistons 106 are formed in a motor carrier 110 that rotates the motor output shaft 111. As the angle of the swash plate 103 is varied, the amount of fluid displaced by the pistons 105 of the pump 101 (and thus the fluid volume received or taken from the chambers of the pistons 106) varies.

Because of these interrelationships, the torque and/or output speed of the motor 102 varies with the angle of swash plate 103. In overview, the swash plate actuator 104, which in this example operates on differential hydraulic pressure, is driven via solenoid valves (not shown in FIG. 1), e.g., one for each of two pressure values, controlled electronically by appropriate input signals from a transmission controller or the like. In this way, a controller can control the output speed of the variator 100 via the application of electrical signals to solenoid valves associated with the swash plate actuator 104.

Figure 2:
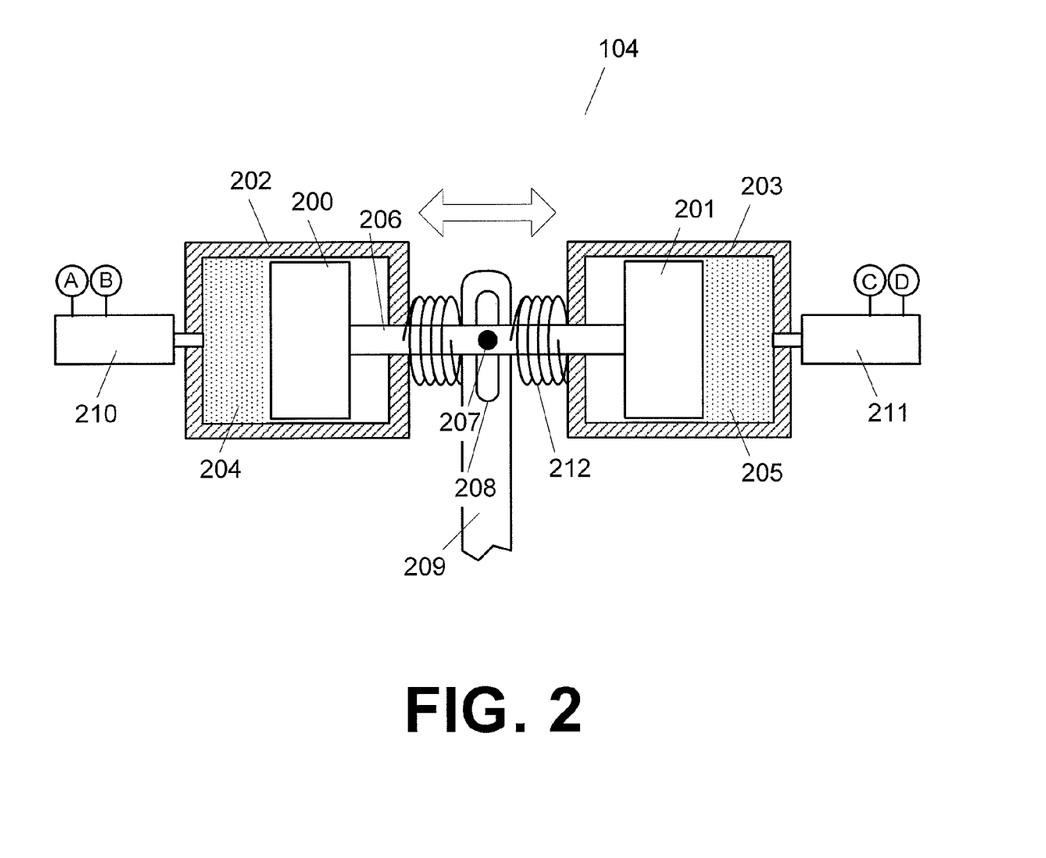
FIG. 2 is a detailed schematic drawing of a hydraulic actuator for controlling the position of a variable-angle swash plate in a variator in accordance with the disclosed principles.

FIG. 2 is a more detailed schematic drawing of the hydraulic actuator 104 for controlling the position of a variable-angle swash plate (not shown in FIG. 2) in a variator 100 such as that shown in FIG. 1. The actuator 104 includes a number of interrelated elements including primarily two opposed pistons 200, 201 (or opposed chambers of a single piston) within respective cylinders 202, 203. The pistons 200, 201 cooperate with the bores of their respective cylinders 202, 203 to form respective pressure chambers 204, 205 for containing pressurized hydraulic fluid.

The pistons 200, 201 are joined by a bar 206 which has a central pivot pin 207 mounted thereon. The central pivot pin 207 interferes within a slot 208 in a swash plate arm 209, such that the lateral position of the bar 206 establishes the position of the swash plate arm 209 and hence the angle of the swash plate itself (not shown). The bar 206 is biased to a central position by opposing springs 212. As the bar 206 is displaced from this central position, there is a restoring force exerted by springs 212 that is proportional to the displacement.

The lateral position of the bar 206 is determined by the positions of the pistons 200, 201 within the cylinders 202, 203. The positions of the pistons 200, 201 are determined by the difference in hydraulic pressure between the piston chambers 204, 205. Respective pressure valves 210, 211 independently control the pressure within chambers 204, 205. In an example, the pressure valves 210, 211 are solenoid valves that supply hydraulic fluid at a pressure that is set by an applied current within limits set by a supply pressure. Thus, in the illustrated example, each valve 210, 211 has at least a current input (illustrated as inputs A and C) and a fluid input (illustrated as inputs B and D). Typically, solenoid valves can supply fluid at any pressure between zero and the fluid pressure at the fluid input B, D. The pressure response of a solenoid valve such as solenoid valves 210 and 211 to a current input is a function of various components and their tolerances.

Because the distance between the pistons 200, 201 is fixed by the length of the bar 206, it is the pressure differential between chambers 204, 205 rather than the absolute pressure within each chamber 204, 205 that establishes the position of the bar 206. In particular, when the bar 206 is in such a position that the net displacement force differential between the pistons 200, 201 is equal to the net restoring force exerted by springs 212, the system is in equilibrium.

Considering FIG. 2 in conjunction with FIG. 1, it will be appreciated that the torque supplied at output 111 is related to the pressure differential applied by valves 210, 211. In particular, the fluid pressure within the hydraulic circuit between pistons 105 and 106 is related to the angle of swash plate 103, and the angle of swash plate 103 is related to the pressure differential applied by valves 210, 211. Thus, in torque-controlled applications, it is desirable to accurately correlate combinations of solenoid currents for valves 210 and 211 (or applied pressure differential in actuator 104) with expected associated output torques at output 111.

Figure 3:
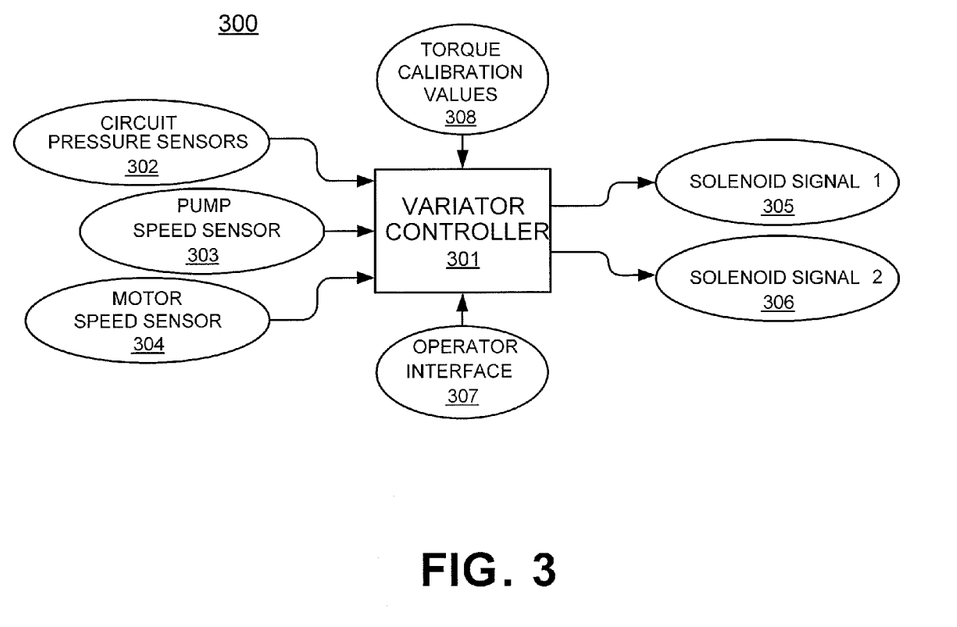
FIG. 3 is a simplified logical schematic of control components and data flow to calibrate and operate the variator in accordance with the disclosed principles.

Before discussing the calibration process in further detail, the control infrastructure and informational flow within the system will be discussed. FIG. 3 is a simplified logical schematic 300 of the control components and data flow associated with the mechanical components of FIGS. 1 and 2 to calibrate and operate the variator 100 effectively. In particular, a variator controller 301 is provided for controlling the operation of the variator 100 via solenoid valves 210 and 211. The variator controller 301 may be a dedicated variator controller, but more typically will also control a larger system, such as a transmission, associated with the variator 100. The controller 301 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

In operation, the controller 301 receives a number of data inputs from the variator system 100 and provides a number of control outputs to the system 100. In particular, the controller 301 has a first data input connected to circuit pressure sensors 302 or other torque sensing devices or sensors. Although it is possible to use a single pressure sensor, it is desirable to use multiple sensors to obtain more accurate pressure readings. The circuit pressure sensors 302 are positioned and adapted to sense the hydraulic pressure within the internal hydraulic circuit of the variator 100 (i.e., between pistons 105 and 106) and to provide signals related to the sensed pressures. A second data input to the controller 301 is linked to a pump speed sensor 303. The pump speed sensor 303 is positioned and adapted to detect the rotational speed of the variator input shaft 108 and to provide a signal related to the sensed rotational input speed. A motor speed sensor 304 is linked to third data input of the controller 301. The motor speed sensor 304 is positioned and adapted to detect the rotational speed of the variator output shaft 110 and to provide a signal related to the sensed rotational output speed. It will be appreciated that the pump displacement (e.g., derived from the stroke of actuator 103) or the angle of the swash plate 103 (e.g., derived from an angle sensor) can be used as an input in place of the motor speed ratio.

In order to detect a desired torque, the controller 301 also receives a data input from the operator interface 307, e.g., an accelerator setting. The operator may be human or automated, and the operator interface 307 may vary accordingly. As noted above, the variator 100 operates in discrete modes, which may be automatically set and/or set based on user input.

The torque calibration values 308 derived by the variator controller 301 are stored during calibration and are retrieved by the variator controller 301 during actual operation. Based on the various available inputs as discussed above, the controller 301 calculates and provides appropriate control signals such that the variator 100 provides an output torque closely corresponding to the desired output torque. In particular, the controller 301 provides two solenoid control signals 305, 306 to control the operation of the actuator 104 and thus the operation of the variator 100. The solenoid control signals 305, 306 include a first solenoid control signal 305 to control a first one 210 of the actuator pressure valves and a second solenoid control signal 306 to control a second one 211 of the actuator pressure valves.

As noted above, however, there may be a significant variation in the qualities and characteristics of a given hydrostatic transmission from what is expected. This can be largely attributed to unavoidable differences in the characteristics of the solenoid valves, e.g., solenoid valves 210, 211. For example, variations in the solenoid valve springs, windings, spools, cages, and so on can have a significant effect on the valve's pressure/current relationship. Other variations within the transmission, e.g., in fluid composition, piston tolerances, etc., may additionally play a secondary role in causing variations between ostensibly identical transmission components.

Another potential source of variability lies in the port plate timing system. In particular, the port plate timing, i.e., the timing with which pressurized fluid is admitted to the motor side of the variator from the pump side of the variator, is often adjustable. While this timing may be calibrated and set, there may be either miscalibration or drift resulting in a discrepancy in the variator response. Any or all of these sources of discrepancy can result in erroneous operation of the variator, wherein the application of parameters expected to yield a certain output torque does not in fact yield the expected torque. Thus, calibration of such a transmission is important to obtain the torque calibration values 308 to enable accurate open loop torque control.

Figure 4:
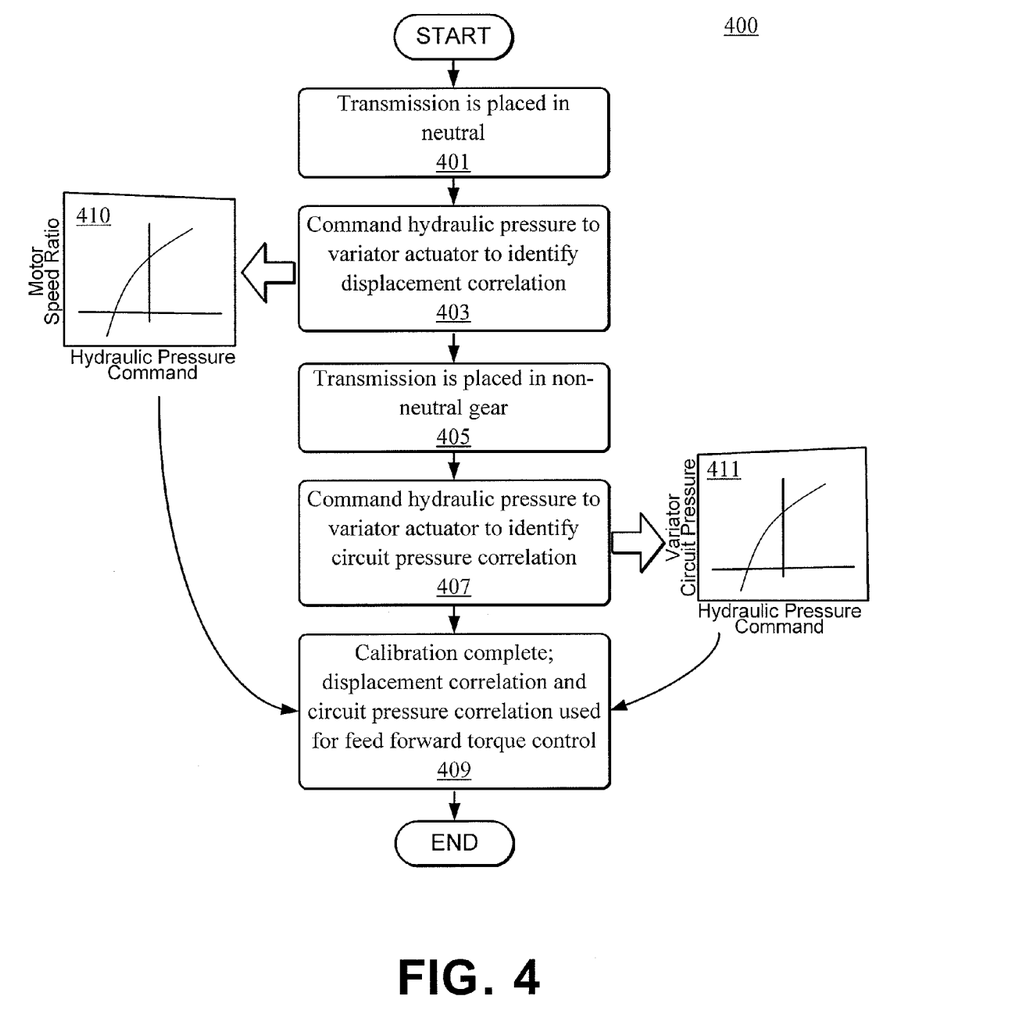
FIG. 4 is a flow chart illustrating a process for calibrating a hydrostatic transmission in accordance with the disclosed principles.

In an embodiment, the hydrostatic transmission is calibrated by the process 400 described in the flow chart of FIG. 4. At stage 401 of the process 400, the transmission is placed in neutral. This may be executed by the variator controller 301 or by a separate transmission controller. With the transmission in neutral, the variator controller 301 commands hydraulic pressure to the variator actuator 104 at stage 403 to identify a displacement correlation 410 between commanded hydraulic pressure to the actuator 104 and variator displacement. The latter may be measured as a motor speed ratio or as a swash plate angle, which is associated with the motor speed ratio after accounting for losses. The displacement correlation is partly reflective of the spring pressure of the bias springs 212 within the actuator 104, as well as the rotational inertia effect.

It will be appreciated that pump valve variations occurring as a function of pressure will be partly encompassed during this step, but that other pump valve variations outside of the range exercised in this step will not be included until later calibration steps. To avoid including the pump valve variation effects twice, the contribution of such variations gleaned in the first calibration stage may later be subtracted out, or may be otherwise accounted for.

The remainder of the calibration process is performed with the transmission in a configuration such that the variator 100 is able to build circuit pressure, e.g., with the hydraulic motor output shaft locked at fixed speed or at zero speed. Thus, at stage 405, the transmission is placed into gear, i.e., it is no longer in neutral. The variator controller 104 then commands hydraulic pressure to the variator actuator 104 at stage 407 to identify a circuit pressure correlation 411 between commanded hydraulic pressure and variator circuit pressure.

In one contemplated embodiment, this state is achieved by intentionally creating a clutch tie-up at a transmission synchronous point. In other words, in a two-clutch system, when the synchronous point is reached, instead of deactivating an off-going clutch and activating an oncoming clutch, both clutches are activated. It will be appreciated that such synchronous points occur at zero output speed as well as certain other non-zero output speeds. Whichever synchronous point is selected, the clutch tie-up will prevent the output speed from changing from the output speed associated with that synchronous point. At that point then, the circuit pressure may be increased and decreased without resulting in a change in output speed, and without a change in swash plate angle, thus allowing circuit pressure to be built.

It will be appreciated that the actuator pressures used in stage 407 will cover a range that includes but also exceeds the range of actuator pressures used in stage 403. As noted above, the pressure effects gleaned during calibration step 403 may be subtracted out at stage 407 or may be subtracted out during later use of the calibration values, so as to avoid double counting any portion of the range.

In this way, the calibration values obtained in stage 403 are applicable to transmission equations used during zero torque conditions, i.e., to adjust speed with open loop equations while torque is zero, such as during synching prior to engaging a clutch. The calibration obtained at stage 407 is applicable to feed forward control when torque is non-zero, e.g., for torque control with the transmission engaged.

At stage 409, the calibration is completed and the displacement correlation 410 and circuit pressure correlation 411 acquired from performing the two calibration operations are used during actual operation to effectively control the transmission using feed forward torque control methods.

As can be seen, both calibrations are run at fixed pump speeds in the described embodiment. However, there is often an effect, be it small or large, of pump speed and circuit pressure as well. Thus, in systems where this relationship is strong, calibrations taken at one pump speed become less applicable as the actual pump speed during operation diverges from the calibration pump speed. Thus, in systems wherein the pressure response is known or expected to be more highly dependent upon pump speed, each calibration step may be executed at multiple pump speeds, and extrapolation may be used if needed to reach intermediate values.

Figure 5:
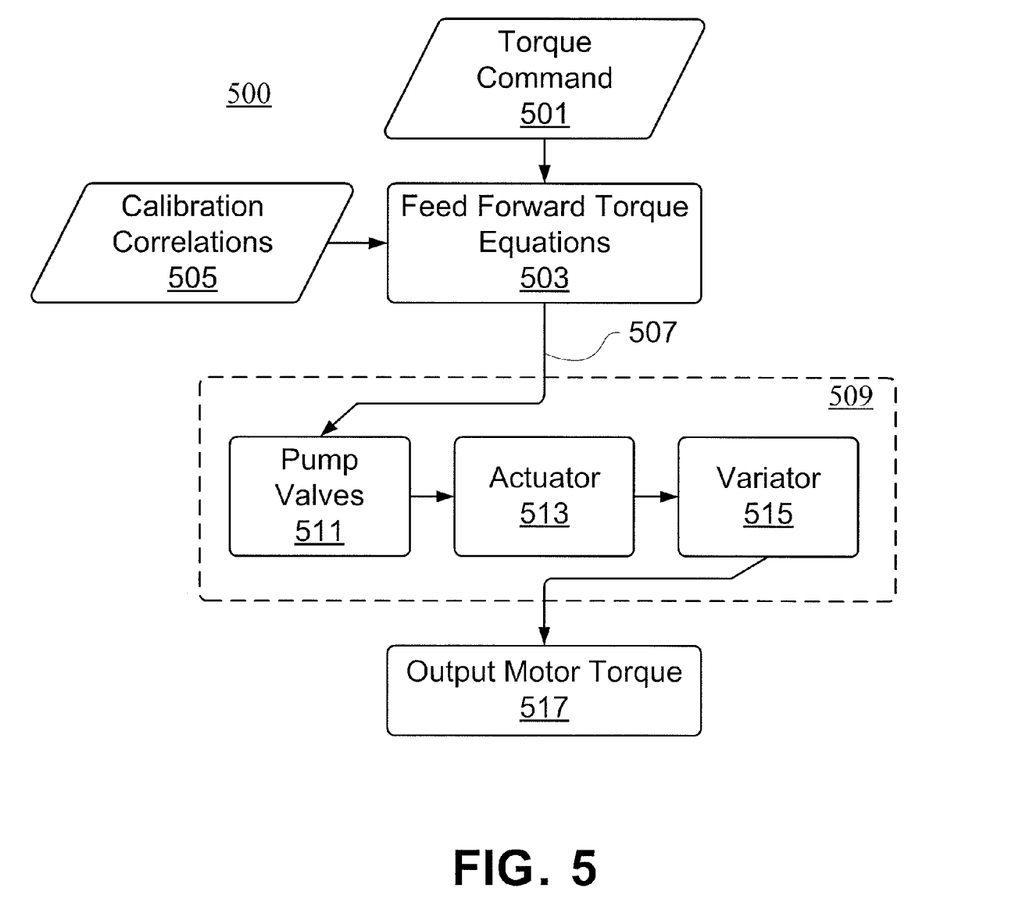
FIG. 5 is a schematic architectural and flow diagram illustrating the use of calibration correlations to control torque in accordance with the disclosed principles.

FIG. 5 is a schematic architectural and flow diagram illustrating in greater detail the use of the calibration correlations to control torque as in stage 409 of process 400. The flow 500 of FIG. 5 begins with a torque command 501, e.g., from a user via a user interface, or from a controller, e.g., automatically changing torque to account for an increase in grade, etc. The torque command 501 is processed by the feed forward torque equations 503 in view of the calibration correlations 505 (i.e., the displacement correlation 410 and the circuit pressure correlation 411) to produce one or more valve commands 507.

The one or more valve commands 507 are provided to the transmission 509. In particular, the one or more valve commands 507 act as input commands to the pump valves 511, which respond by adjusting to the commanded level. The pump valves 511 control the actuator 513 (e.g., swash plate actuator 104). The position of the actuator 513 modifies the operation of the variator 515 (e.g., variator 100 of FIG. 1), which provides a motor torque output 517 substantially matching the initial torque command 501. In this manner, accurate and efficient feed forward control of torque is provided.

Although the foregoing discussion pertains by way of example to certain calibration techniques that remove the effects of inertia, it will be appreciated that this simplification may be forgone if so desired. Thus, for example, in a system where inertial effects during acceleration are largely quantified, the zero acceleration calibration of stage 411 may instead be reconfigured to allow acceleration, with the effects of inertia then being accounted for and decoupled from the calibration results.

INDUSTRIAL APPLICABILITY

The described principles are applicable to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Exemplary implements include, without limitation, buckets, compactors, forked lifting devices, brushes, grapples, cutters, shears, blades, breakers/hammers, augers, and others.

Within such applications, the described principles apply to the operation of hydrostatic and hydraulic continuously variable transmissions to allow accurate torque control using a feed forward control configuration. This allows the operation of the host machine to be controlled in a more effective manner than simple traditional speed control or other alternative control strategies.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. For example, the illustrated calibration steps may optionally be executed in reverse order, and other alternative orders and steps may be practicable where logically appropriate without departing from the described principles.

We claim:

1. A method of calibrating a transmission for open loop torque control operation, the transmission having a variator, the variator having an actuator and an output, the variator further having an internal circuit pressure, the method comprising:
engaging the transmission in neutral, such that the variator output experiences substantially zero torque;
with the transmission in neutral, commanding hydraulic pressure to the variator actuator to identify a displacement correlation between commanded hydraulic pressure to the actuator and variator displacement;
engaging the transmission into a mode wherein the variator provides a fixed output speed regardless of circuit pressure;
commanding hydraulic pressure to the variator actuator to identify a circuit pressure correlation between commanded hydraulic pressure and variator circuit pressure; and
using the displacement correlation and circuit pressure correlation to control the transmission using feed forward torque control.

2. The method of calibrating a transmission for open loop torque control operation according to claim 1, wherein the steps of commanding hydraulic pressure to the variator actuator are executed via commands sent to one or more hydraulic valves.

3. The method of calibrating a transmission for open loop torque control operation according to claim 1, wherein the steps of engaging the transmission in neutral and engaging the transmission into a mode wherein the variator provides a fixed output speed are executed by a variator controller separate from a transmission controller.

4. The method of calibrating a transmission for open loop torque control operation according to claim 1, wherein the steps of engaging the transmission in neutral and engaging the transmission into a mode wherein the variator provides a fixed output speed are executed by a transmission controller.

5. The method of calibrating a transmission for open loop torque control operation according to claim 1, wherein the displacement correlation between commanded hydraulic pressure to the actuator and variator displacement is measured as one of motor speed ratio and swash plate angle.

6. The method of calibrating a transmission for open loop torque control operation according to claim 1, wherein the circuit pressure correlation between commanded hydraulic pressure and variator circuit pressure is affected by one or more of port plate timing, an actuator spring characteristic, and hydraulic losses.

7. The method of calibrating a transmission for open loop torque control operation according to claim 1, wherein the variator actuator includes one or more electrically actuated pressure valves, and wherein the displacement correlation between commanded hydraulic pressure to the actuator and variator displacement is affected by one or more characteristics of the electrically actuated pressure valves.

8. The method of calibrating a transmission for open loop torque control operation according to claim 1, wherein the variator actuator includes one or more electrically actuated pressure valves, and wherein the circuit pressure correlation between commanded hydraulic pressure and variator circuit pressure is affected by one or more characteristics of the electrically actuated pressure valves.

9. The method of calibrating a transmission for open loop torque control operation according to claim 1, wherein engaging the transmission into a mode wherein the variator provides a fixed output speed regardless of circuit pressure includes forcing a clutch tie-up.

10. A system for calibrating a transmission for open loop torque control operation, the transmission having a variator, the variator having an actuator and an output, the variator further having an internal circuit pressure, the method comprising:
    one or more sensors for indicating a displacement of the actuator;
    one or more pressure sensors for determining the internal circuit pressure of the variator; and
    a controller for executing computer-readable instructions stored in a non-transitory storage medium for calibrating the transmission including:
    instructions for engaging the transmission in neutral, such that the variator experiences substantially zero output torque, and commanding hydraulic pressure to the variator actuator to identify a displacement correlation between commanded hydraulic pressure to the actuator and variator displacement;
    instructions for engaging the transmission into a mode wherein the variator produces an output having a fixed speed and commanding hydraulic pressure to the variator actuator to identify a circuit pressure correlation between commanded hydraulic pressure and variator circuit pressure; and
    instructions for using the displacement correlation and circuit pressure correlation to control the transmission using feed forward torque control.

11. The system for calibrating a transmission for open loop torque control operation according to claim 10, wherein the instructions for commanding hydraulic pressure to the variator actuator include instructions for providing one or more commands to one or more hydraulic valves.

12. The system for calibrating a transmission for open loop torque control operation according to claim 10, wherein the displacement correlation between commanded hydraulic pressure to the actuator and variator displacement is measured as one of a motor speed ratio and a swash plate angle.

13. The system for calibrating a transmission for open loop torque control operation according to claim 11, wherein the displacement correlation and the pressure correlation are affected by one or more characteristics of the one or more hydraulic valves.

14. The system for calibrating a transmission for open loop torque control operation according to claim 11, wherein the circuit pressure correlation is affected by one or more of port plate timing, an actuator spring characteristic, and hydraulic losses.

15. The system for calibrating a transmission for open loop torque control operation according to claim 10, wherein the variator is made to produce an output having a fixed speed by causing a clutch tie-up.

16. A transmission controller for operating a hydrostatic transmission, the controller including a computer-readable memory having thereon computer-executable instructions stored in a non-transitory storage medium for transmission calibration and control, the instructions comprising:
    instructions for engaging the transmission in neutral and for commanding hydraulic pressure to a variator actuator of the transmission to identify a displacement correlation between commanded hydraulic pressure to the actuator and a variator displacement;
    instructions for placing the transmission into mode wherein the variator experiences a non-zero output torque, and for commanding hydraulic pressure to the variator actuator to identify a circuit pressure correlation between commanded hydraulic pressure and a variator circuit pressure; and
    instructions for controlling the transmission using feed forward torque control based at least in part on the displacement correlation and the circuit pressure correlation.

17. The transmission controller for operating a hydrostatic transmission according to claim 16, wherein the instructions for commanding hydraulic pressure to the variator actuator include instructions for providing one or more commands to one or more hydraulic valves.

18. The transmission controller for operating a hydrostatic transmission according to claim 16, wherein the displacement correlation between commanded hydraulic pressure to the actuator and variator displacement is measured as one of a motor speed ratio and a swash plate angle.

19. The transmission controller for operating a hydrostatic transmission according to claim 17, wherein the displacement correlation between commanded hydraulic pressure to the actuator and variator displacement is reflective of one or more characteristics of the one or more hydraulic valves.

20. The transmission controller for operating a hydrostatic transmission according to claim 16, wherein the instructions for placing the transmission into mode wherein the variator experiences a non-zero output torque includes instructions for placing the transmission into a mode wherein the variator provides a fixed speed output.

21. The transmission controller for operating a hydrostatic transmission according to claim 20, wherein the instructions for placing the transmission into a mode wherein the variator provides a fixed speed output includes instructions for causing a clutch tie-up.

* * * * *